Oct. 29, 1935.  L. FERRARI  2,019,006
CHANGE SPEED GEAR
Filed Feb. 1, 1934   3 Sheets-Sheet 2
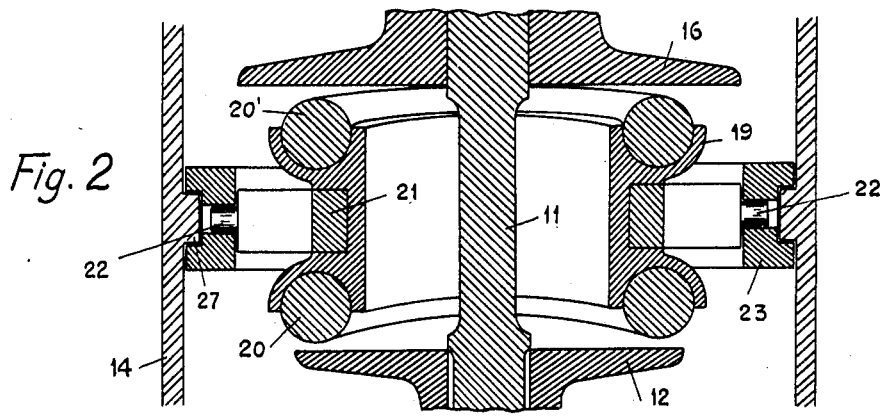
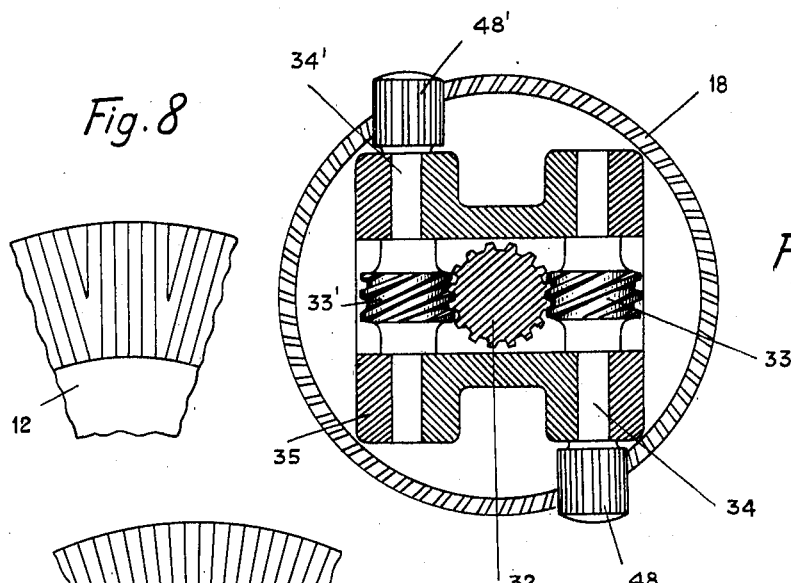
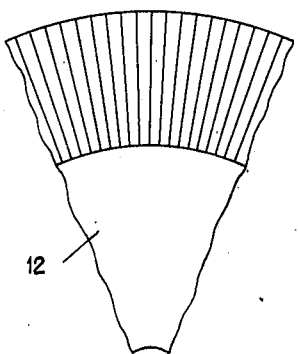

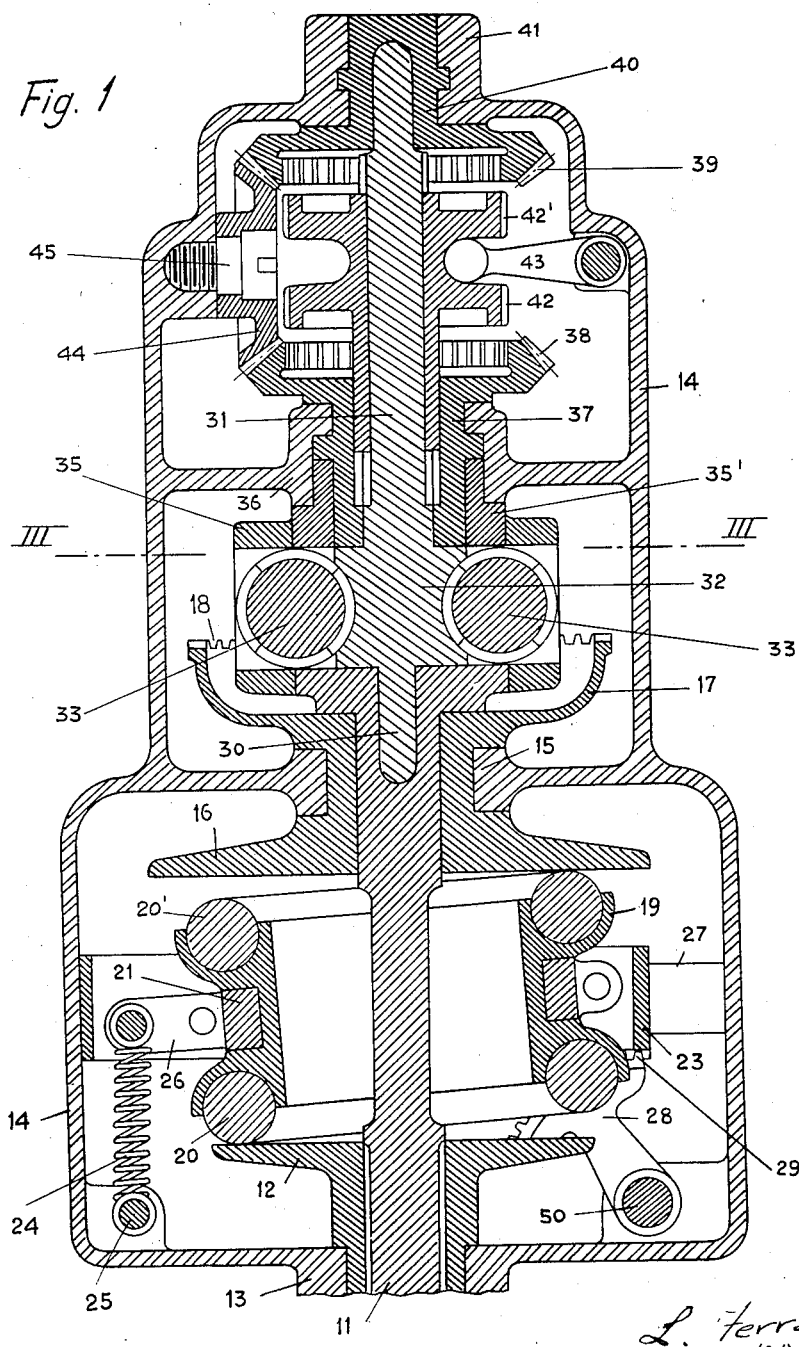

Oct. 29, 1935. L. FERRARI 2,019,006
CHANGE SPEED GEAR
Filed Feb. 1, 1934 3 Sheets-Sheet 3

L. Ferrari
INVENTOR

By Marks & Clerk
Attys.

Patented Oct. 29, 1935

2,019,006

UNITED STATES PATENT OFFICE 2,019,006

CHANGE SPEED GEAR

Lorenzo Ferrari, Genoa, Italy

Application February 1, 1934, Serial No. 709,375

5 Claims. (Cl. 74—201)

This invention relates to change speed gears and its object is to provide a device of this kind that may be fitted to any rotating device and especially on motor cars or the like and allows gradual change of the speed of the receiving shaft without first disengaging the clutch.

According to the invention this end is attained by providing an inclined drum having two annular crowns each contacting with one of two opposite plate members, and eventually by providing a worm and helical gear drive between the driving and the driven shaft in order to suitably reduce the turns of the controlled shaft.

The invention will be better understood from the following specification by reference to the accompanying drawings, in which:

Figure 1 is an axial section through a complete change speed gear.

Figure 2 is an axial section at right angles of Figure 1 of the lower part of the change speed gear.

Figure 3 is a transversal section on line III—III of Figure 1.

Figures 7 and 8 show in plan view part of one of the plates indented at its border for use with the embodiment shown in Figure 6.

Figure 4:
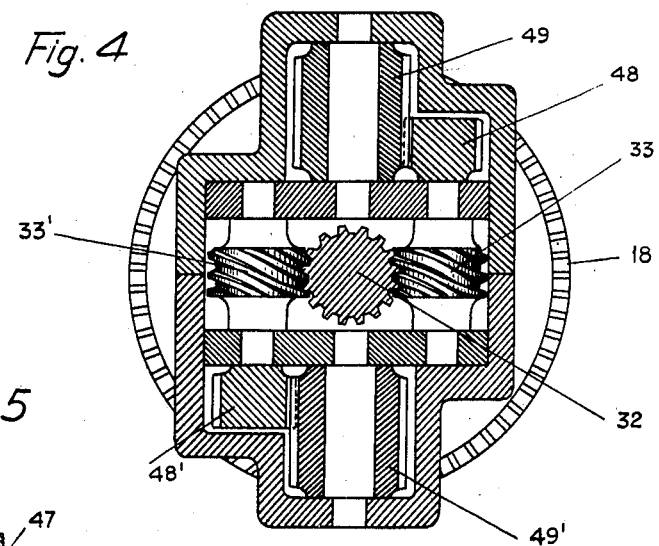
Figure 4 shows a modification of the worm drive shown in Figures 1 and 3.

According to the invention, to the driving shaft 11 a transmission plate 12 is fastened that rotates in a bearing 13 of a casing 14 enclosing the whole change speed gear. The casing 14 has further an intermediate flange providing a bearing 15 for a rotatable member comprising a plate 16 opposite to plate 12 and a bell-like member 17 having a toothed crown 18. This member 16, 17 is rotatably mounted on shaft 11 and within bearing 15. Between plates 12 and 16 an inclined drum 19 is fitted provided at its ends with annular adherence members, that in the case as shown are constituted by rubber rings 20, 20'. Drum 19 is mounted within a collar 21 having pivots 22 rotatable in bearings of a frame 23, and is kept with its adherence rings 20, 20' into driving contact with plates 12 and 16, by a spring 24 attached by one of its ends to a pin 25 fastened to casing 14 and by the other end to a lever arm 26 integral with collar 21 rotatably mounted in an annular groove formed in the cylindrical part of drum 19.

Frame 23 is slidably mounted on guides 27 and may be shifted along these guides by means of toothed sectors 28 engaging rack teeth 29 formed at the lower border of frame 23. Sector 28 is keyed to a shaft 50 rotatable in bearings of casing 14 and passing through this latter member.

Suitable means are fitted to the exterior of this casing for oscillating this sector. In this manner frame 23 with collar 21 and drum 19 may be shifted horizontally, so that the adherence members 20, 20' are allowed to slide radially along plates 12 and 16.

Within an axial cavity of shaft 11 a projection 30 of a second shaft 31 is rotatably mounted integral with a helical gear 32 in mesh with a pair of worm gears 33, 33'. Worms 33, 33', are each fitted to one end of shafts 34, 34' to the other end of which pinions 48 and 48' are fitted, in mesh with gear 18 of bell 17. Shafts 34, 34' are rotatable in bearings of a block 35 rotatably supported within a bearing 36 of casing 14. Within this bearing 36 a shouldered hub 37 is also rotatably mounted, integral with a gear 38 comprising an outer conical gear and an inner cylindrical tooth crown constituting a clutch member. A second like gear 39 provided with a blind shouldered hub 40, constituting the first portion of the driven shaft, is rotatably mounted on the stub end of shaft 31 and within a bearing formed in an end hub 41 of casing 14. On shaft 31 a double clutch 42, 42' is slidable, and a shift lever 43 is provided for shifting this double gear 42, 42' to mesh with either of the gears 38, 39, or to leave same in an intermediate idle position, as shown. Lever 43 may be singularly oscillated by known means from the exterior of casing 14. However gears 38 and 39 are coupled together through their bevel parts by an intermediate bevel gear 44 mounted on stub shaft 45 fitted to casing 14.

The operation of the device is as follows:

Assuming drum 19 to be concentrical with shaft 11, by rotating this latter, plate 12 will drive drum 19 and this in its turn will drive plate 16 at the same speed as plate 12. Toothed bell 18 will thus rotate at the same speed as shaft 11 and thus the whole device will rotate as it were in a single piece. This position of drum 19 corresponds to direct coupling.

Now by operating lever 28, so as to shift frame 23 towards the right of Figure 1, owing to the difference of the contact radii of plates 12 and 16 with the adherence rings 20, 20' of drum 19, plate 16 will be driven at a speed that is less than that of plate 12. This difference will be multiplied by the worm drive 33, 32, 33' and, owing to the turning direction of the thread of worms 33, 33', the shaft 31 will be driven in a turning direction that is opposite to that of shaft 11. The turning speed of driven shaft 40, will be thus proportional to a multiple of the difference of speed of plates 12 and 16. Thus at a certain time, when shafts 11 and 31 turn at the same speed in opposite directions, the driven shaft 40 will stop.

Beyond this limit, a reverse movement of the driven shaft will result.

In practice however the reversion of the turning direction of the driven shaft is effected through double clutch gear 42, 42' which is shifted by lever 43.

When gear 42, 42' is shifted in the idle position as shown in Figure 1, shaft 41 will be stopped. When gear 39 is clutched, the driven shaft integral with hub 40 will be driven in the same direction as the driving shaft; when gear 38 is clutched, a reverse movement of the driven shaft will result.

The reversion of the turning direction of driven shaft will be effected progressively, by gradually reducing to nil the speed of the driven shaft.

The pitch of the worm 33, 33' will be chosen so as to reduce to a minimum the resistance of plate 16 to its driving by means of drum 19 and thus in some cases rubber rings 20 and 20' will be sufficient to resist the stresses set up by their frictional engagement with plates 12 and 16. In some cases however the engagement between the borders of drum 19 and the plates 12 and 16 might be effected by other known means, as indented surfaces, and so on.

It is apparent that many variations of the device as just described are possible, though remaining within the limits of the invention.

Figure 5:
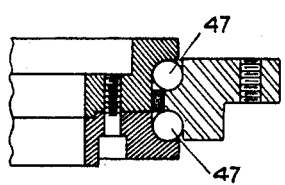
Figure 5 is a detail section of a variation of the connection between the annular member and the drum, by the insertion of ball bearings.
Figure 6:
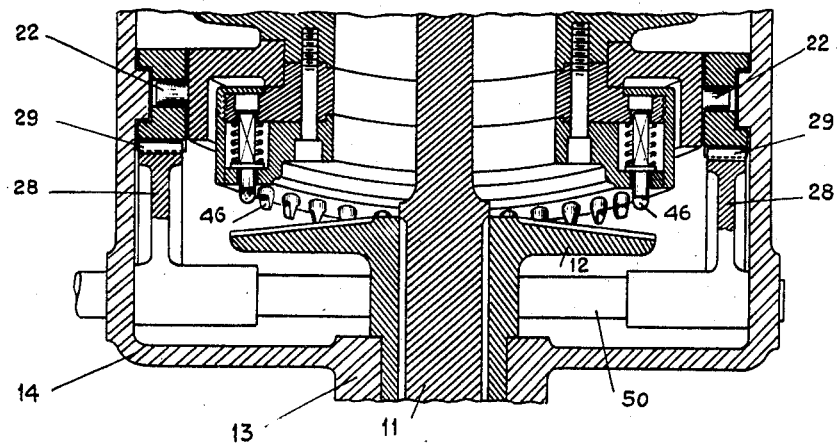
Figure 6 shows a modification of arrangement shown in Figure 2.

Thus the adherence between drum 19 and plates 12 and 16 could be effected by means of a crown of spring-pressed members 46, Figure 6, engaging radial or parallel indentations of plates 12 and 16, which could be made as shown in Figure 7 or 8. Furthermore the collar 21 could be mounted on the corresponding annular groove of drum 19 on suitable ball bearings 47, as shown in Figure 5.

The worm gears 33, 33' could also be actuated through intermediate pinions 48, 48' by diametrically opposite pinions 49, 49' engaging the teeth 18 of bell 17.

Having thus described my invention, I claim:

1. In a change speed gear, the combination of a driving shaft, a plate on said shaft, a driven shaft, a second plate facing the first named plate having connection with the driven shaft, a casing enclosing and supporting said plates and said shafts, a transverse guide member within said casing intermediate said plates, a frame slidably mounted on said guide member, means for positively shifting said frame along said guide member, bearings at opposite points of said frame, a collar having diametrically opposed pivots journaled in said bearings, a drum rotatably mounted in said collar, driving members on the borders of said drum establishing a driving connection between said drum and the opposite plates, means for maintaining said drum in an inclined position with the diametrically opposed points of the driving members in contact with said two plates.

2. A change speed gear as claimed in claim 1 characterized in that said driving members are constituted by rubber rings.

3. A change speed gear as claimed in claim 1 characterized in that said means for maintaining the drum in an inclined position is constituted by a spring secured at one end to the casing and at the other end to said drum.

4. A change speed gear as claimed in claim 1 characterized in that said means for shifting said frame is constituted by teeth formed on the frame and a toothed sector engaging said teeth and a shaft supporting said sector.

5. A change speed gear as claimed in claim 1 characterized in that said driving members are constituted by spring teeth fitted in said drum, and teeth on said plates engaged by the first mentioned teeth.

LORENZO FERRARI.